Aug. 6, 1935. A. T. VAN URK 2,010,529

ELECTRO DYNAMIC MOVING SYSTEM

Filed Feb. 21, 1931

INVENTOR
AREND THOMAS VAN URK
BY
ATTORNEY

Patented Aug. 6, 1935

2,010,529

UNITED STATES PATENT OFFICE 2,010,529

ELECTRO DYNAMIC MOVING SYSTEM

Arend Thomas van Urk, Eindhoven, Netherlands, assignor to Radio Corporation of America, a corporation of Delaware Application February 21, 1931, Serial No. 517,624 In Germany May 26, 1930

3 Claims. (Cl. 179—115.5)

This invention relates to the movable system of an electro-dynamic device for converting electric oscillations into acoustic vibrations or conversely, said system being provided with an oscillatory member and a cylinder for wire windings fixed thereto by means of a flange shaped shoulder. The invention has for its object an effective connection between the ends of the wire windings and the conductors necessary for their connection.

It is well known to arrange the means of connection of such systems in the wall of the cylinder for the wire windings. This has however a limitation in the fact that the means of connection, which are preferably of metal, may bring about a short-circuit owing to the fact that during the movement of the wire windings in the magnet field they may come into contact with metal parts of the magnet system.

In the movable system according to the invention this risk is obviated by arranging the means of connection at the point where the oscillatory member and the cylinder are fixed to each other. The distance between the connecting means and the metal parts of the magnet system has thus become so great that there is no longer any risk of short circuit. The means of attachment preferably consist of members formed as eyelets which have their edge protruding on one side from the oscillatory member and on the other side from the flange-shaped shoulder of the cylinder. In order to protect the end of the wire windings from mechanical damage, the ends are preferably guided to the eyelets through grooves in the inner wall of the cylinder.

Figure 1:
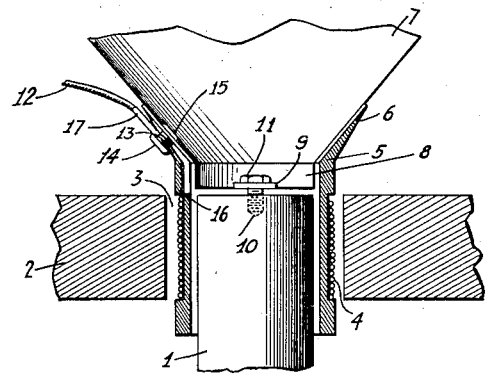
Figure 2:
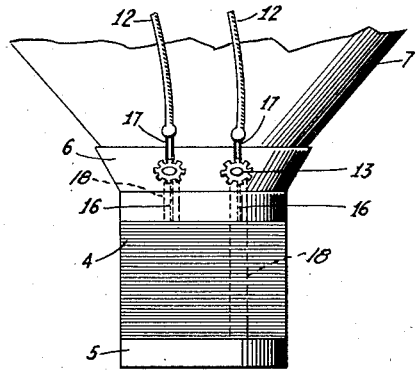

In order that the invention may be clearly understood and readily carried into effect one form of a movable system according to the invention adapted for use in an electro-dynamic loudspeaker will be described more fully with reference to the accompanying drawing, in which Figure 1 is a sectional view and Figure 2 is an elevation of such a system.

Referring to Figure 1, I designates the central pole and 2 the annular pole of a permanent magnet or an electromagnet in the air gap 3 of which are movably arranged wire windings 4 placed in position in an annular recess of a cylinder 5. The cylinder which may be, for example, of artificial resin has a flange-shaped shoulder 6 by means of which the oscillatory member 7 may be joined, for example by sticking, to the cylinder 5 so as to form one single piece. The oscillatory member 7 has a cylindrical part 8 the opening 9 of which is closed, for example, by a piece of stiffened cotton texture. This textile texture permits the oscillatory member to be movably joined to the magnet system by means of a threaded stud 10 arranged in the central pole and a nut 11 to go with it.

The ends of the wire windings 4 and the conductors 12 necessary for their connection are united by means of members 13 which are formed as eyelets and which have their edges 14 and 15, which are bent outward and over, protruding from the outside of the cylinder and from the inside of the oscillatory member respectively. In order that the ends 16 of the wire windings 4 may be protected from mechanical damage, they pass in grooves 18 arranged on the inside of the cylinder. The conductors 12 are connected to the eyelets 13 by means of small cable sockets 17. By rigidly flattening the eyelets in a convenient manner after the connections have been provided, a connection between the wire windings and the conductors is obtained which is highly resistant to mechanical damage. In order to further improve the connection, the conductors and the ends of the wire windings, though it is perhaps unnecessary, may be soldered to the eyelets.

What I claim is:

1. A movable system for an electrodynamic acoustic device comprising an oscillatory member, a coil support affixed to said member; a coil on said support, electrical conductors adapted to be connected to the terminals of said coil, means for providing electrical connections between the terminals of said coil and said conductors, and grooves in said coil support for guiding the ends of said coil to said means.

2. The system as claimed in claim 1 in which said grooves are in the inner wall of said support.

3. The system as claimed in claim 1 in which said means consist of eyelets riveted through said member and said support, and in which the grooves for guiding the ends of the coil to said eyelets are in the inner wall of said support.

AREND THOMAS van URK.